(12) United States Patent
Hirano et al.

(10) Patent No.: US 9,019,600 B2
(45) Date of Patent: Apr. 28, 2015

(54) MICROSCOPE SYSTEM

(71) Applicant: Olympus Corporation, Tokyo (JP)

(72) Inventors: Ryuichi Hirano, Hachioji (JP); Hideki Obuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 255 days.

(21) Appl. No.: 13/674,324

(22) Filed: Nov. 12, 2012

(65) Prior Publication Data

US 2013/0120833 A1    May 16, 2013

(30) Foreign Application Priority Data

Nov. 16, 2011    (JP) .................................. 2011-250971

(51) Int. Cl.
*G02B 21/06* (2006.01)
*G02B 21/24* (2006.01)
*G02B 21/08* (2006.01)

(52) U.S. Cl.
CPC ................ *G02B 21/06* (2013.01); *G02B 21/08* (2013.01); *G02B 21/24* (2013.01)

(58) Field of Classification Search
CPC ....... G02B 21/06; G02B 21/08; G02B 21/241
USPC .......................................... 359/368, 383, 385
See application file for complete search history.

(56) References Cited

U.S. PATENT DOCUMENTS

| | | | | |
|---|---|---|---|---|
| 4,725,720 A | * | 2/1988 | Sawada et al. ............. | 250/201.3 |
| 5,175,644 A | * | 12/1992 | Dosaka ...................... | 359/392 |
| 5,270,855 A | * | 12/1993 | Hasegawa .................. | 359/368 |
| 6,160,662 A | * | 12/2000 | Uchida et al. .............. | 359/390 |
| 6,195,203 B1 | * | 2/2001 | Kadogawa ................. | 359/385 |
| 6,693,741 B1 | * | 2/2004 | Sukekawa .................. | 359/368 |
| 6,853,481 B1 | * | 2/2005 | Sukekawa .................. | 359/368 |
| 6,967,773 B2 | * | 11/2005 | Sukekawa .................. | 359/368 |
| 7,876,948 B2 | * | 1/2011 | Wetzel et al. .............. | 382/133 |
| 2002/0149845 A1 | * | 10/2002 | Mayer ......................... | 359/391 |
| 2006/0092503 A1 | * | 5/2006 | Saunders .................... | 359/368 |
| 2006/0139747 A1 | * | 6/2006 | Dietzsch et al. ............ | 359/368 |
| 2008/0291532 A1 | * | 11/2008 | Xu et al. ..................... | 359/383 |

FOREIGN PATENT DOCUMENTS

| | | |
|---|---|---|
| JP | 2001-066514 A | 3/2001 |
| JP | 2001-066515 A | 3/2001 |

* cited by examiner

*Primary Examiner* — Frank Font
(74) *Attorney, Agent, or Firm* — Holtz, Holtz, Goodman & Chick PC (57) ABSTRACT

A microscope system includes a microscope body having a base portion forming a foundation, an arm portion extending substantially parallel to a bottom surface of the base portion, and a frame portion connecting ends of the base portion and the arm portion, having substantially a C shape in side view and holding an illumination optical system ejecting illumination light from a light source to a specimen. A light source unit is connected with the microscope body and radiates illumination light to the illumination optical system. A focusing unit supports a stage for placing the specimen and at least holding an objective lens focusing the specimen by collecting observation light from the specimen on the stage. The microscope body and the focusing unit do not contact each other in a state where an optical axis of the objective lens coincides with an optical axis of the illumination light.

6 Claims, 10 Drawing Sheets

PRIOR ART

FIG.18

PRIOR ART

MICROSCOPE SYSTEM

CROSS-REFERENCE TO RELATED APPLICATIONS

This application is based upon and claims the benefit of priority from Japanese Patent Application No. 2011-250971, filed on Nov. 16, 2011, the entire contents of which are incorporated herein by reference.

BACKGROUND OF THE INVENTION

1. Field of the Invention

The present invention relates to, for example, a microscope system that irradiates illumination light to a specimen and acquires a specimen image generated based on light transmitted or reflected by the specimen.

2. Description of the Related Art

In the related art, a microscope system with a microscope apparatus has been used, which illuminates and observes a specimen to observe cells, and the like in a field such as medicine or biology. Further, in an industrial field, a microscope apparatus has been used for various purposes such as quality management of a metallic structure, and the like, or research and development of new materials, examination of electronic devices or magnetic heads, and the like. In addition, as a microscope system that observes a specimen, a microscope system has been known, which has a configuration that captures the specimen image by using an imaging device such as a CCD camera and displays the specimen image on a monitor, in addition to observation with naked eyes.

In the microscope system, a large amount of light needs to be radiated to the specimen in order to expansively observe a minute region of the specimen. Thus, in the microscope system, a mercury lamp or a halogen lamp is used as a light source. In many cases, the light source is attached to a back surface of the microscope system so as to prevent the observer from being interrupted when the observer observes the specimen in a comfortable position with his/her arms put on a desk, makes a memo on the desk, or the like.

Figure 17:
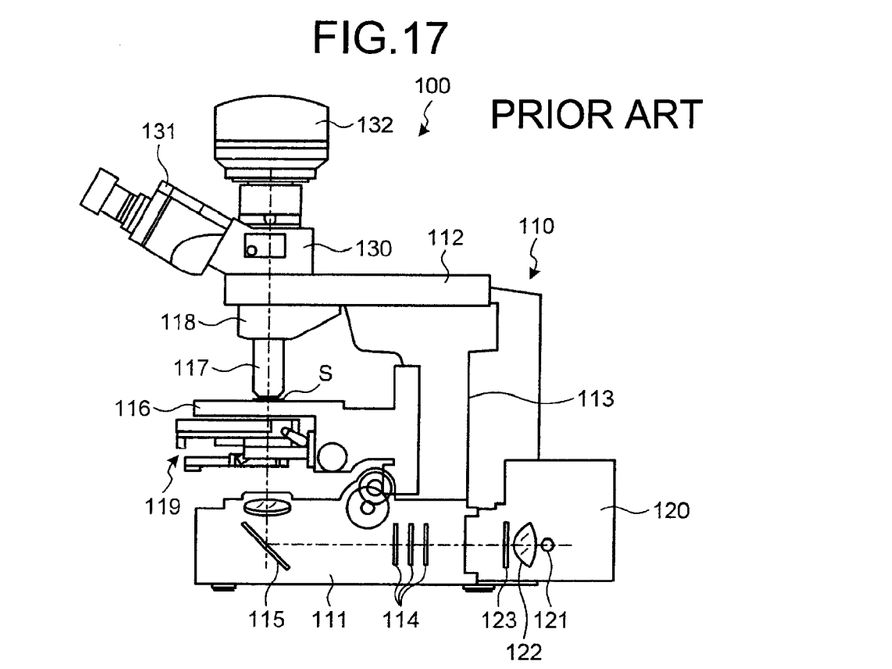
FIG. 17 is a schematic diagram illustrating a configuration of a microscope system in the related art.

For example, as illustrated in FIG. 17, a transmissive microscope system 100 in the related art includes a microscope body part 110 having substantially a C shape, a lamp house 120 attached to the microscope body part 110 and radiating illumination light for transmitting a specimen S, and an adapter 130 attached to the microscope body part 110 and guiding light (observation light) transmitting the specimen S to a lens barrel 131 or a camera 132. The microscope body part 110 includes a base portion 111 forming a foundation, an arm portion 112 extending substantially parallel to a bottom surface of the base portion 111, and a frame portion 113 connecting the ends of the base portion 111 and the arm portion 112.

The base portion 111 is connected with the lamp house 120 and ejects the illumination light from the lamp house 120 to the specimen S. The base portion 111 includes a filter insertion/removal mechanism constituted by a plurality of filters 114 holding a filter for adjusting a color tone or brightness of the light source and an illumination optical system constituted by a mirror 115 reflecting the illumination light to the specimen S, and ejects the illumination light from the lamp house 120 to the specimen S.

The arm portion 112 holds an objective lens 117 through a revolver 118 and includes therein an observation optical system provided on an optical axis of the objective lens 117. The adapter 130 connected to the arm portion 112 switches a light path to the lens barrel 131 or the camera 132 with respect to the observation light acquired from the observation optical system or branches the observation light to both sides at a ratio of 50:50.

The frame portion 113 extends vertically from the base portion 111 and has a stage 116 for placing the specimen S. The stage 116 places the specimen S and supports a condenser unit 119 having a lens that condenses the illumination light from the base portion 111 on the specimen S. The stage 116 can move vertically along the optical axis of the objective lens 117 and can move a specimen placement surface on which the specimen S is placed in a direction parallel to the surface.

The lamp house 120 includes a light source 121, a collector lens 122 collecting light radiated from the light source 121, and a heat ray absorbing filter 123 absorbing a heat ray (infrared ray).

By the aforementioned configuration, the illumination light radiated from the lamp house 120 transmits the specimen S and the transmitted light from the specimen S is transferred to the lens barrel 131 and/or the camera 132 through the objective lens 117 and the observation optical system to observe an observation image of the specimen S.

In the microscope system 100 in the related art, heat generated from the lamp house 120 (light source 121) is transferred to the base portion 111 and the frame portion 113 of the microscope body part 110 at the time of observing the specimen S and the microscope body part 110 thermally expands by the heat or heat distribution of the microscope body part 110 becomes non-uniform. As a result, the microscope body part 110 is deformed, and a distance between the stage 116 supporting the specimen S and the objective lens 117 varies from several microns to tens of microns. The variation in the distance between the stage 116 and the objective lens 117 has a large influence on a very small focal depth range and causes a focusing position adjusted once to be lost in the microscope.

In regard to the problem, for example, Japanese Patent Application Laid-open No. 2001-066514 discloses a technology that suppresses the variation in the distance between the stage and the objective lens by alleviating stretching deformation of the frame portion due to the heat with bending deformation of the arm portion. In detail, the base portion, the frame portion, and the arm portion of the microscope body part are configured as individual bodies, and respectively fixed through fastening members, and a contact area between the base portion and the frame portion is formed to be smaller than a predetermined contact area, thereby reducing heat transfer to the frame portion and the arm portion from a power supply and the illumination optical system. Alternatively, the frame portion and the arm portion are formed by materials having different thermal expansion rate.

Japanese Patent Application Laid-open No. 2001-066515 discloses a technology that includes a contact area adjusting member for reducing a contact area between the base portion and the frame portion or between the frame portion and the arm portion of the microscope body part, and suppresses the variation in the distance between the stage and the objective lens by reducing heat transfer to the frame portion from the base portion or to the frame portion from the arm portion by using the contact area adjusting member.

Figure 18:
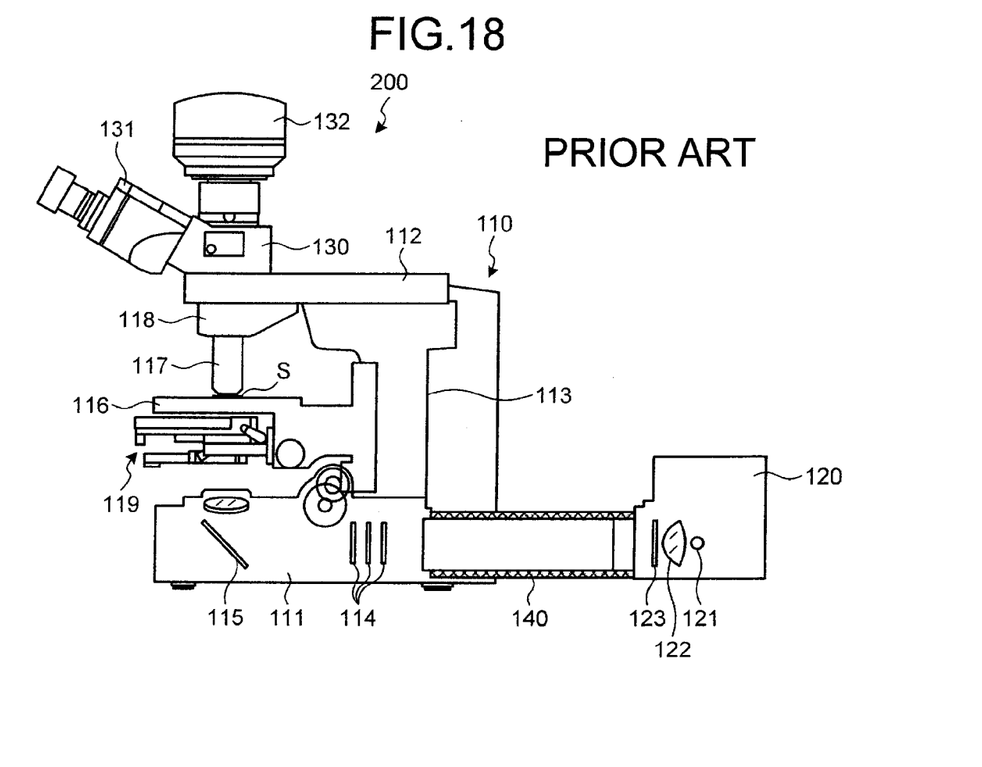
FIG. 18 is a schematic diagram illustrating a configuration of a microscope system in the related art.

In addition, like a microscope system 200 illustrated in FIG. 18, by an adapter 140 connected with each of the microscope body part 110 and the lamp house 120, a distance between the microscope body part 110 and the lamp house 120 increases and heat transfer from the lamp house 120 to the microscope body part 110 is reduced.

SUMMARY OF THE INVENTION

A microscope system according to an aspect of the present invention includes: a microscope body part including a base portion forming a foundation, an arm portion extending substantially parallel to a bottom surface of the base portion, and a frame portion connecting the ends of the base portion and the arm portion, the microscope body part having substantially a C shape in a side view and holding an illumination optical system ejecting illumination light from a light source to a specimen; a light source unit connected with the microscope body part and radiating the illumination light to the illumination optical system; and a focusing unit supporting a stage for placing the specimen and at least holding an objective lens focusing the specimen by collecting observation light from the specimen on the stage, wherein the microscope body part and the focusing unit do not contact each other in a state where an optical axis of the objective lens coincides with an optical axis of the illumination light.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described in detail with reference to the accompanying drawings. The present invention is not limited to the embodiments. In the following description, each drawing just schematically illustrates a shape, a size, and a positional relationship to understand the present invention and therefore, the present invention is not limited to the shape, the size, and the positional relationship illustrated in each drawing. Furthermore, in each drawing, a part of hatching on a cross section is omitted for clearness of a configuration. Moreover, numerical values described below are just examples suitable for the present invention and therefore, the present invention is not limited to the described numerical values.

First Embodiment

Figure 1:
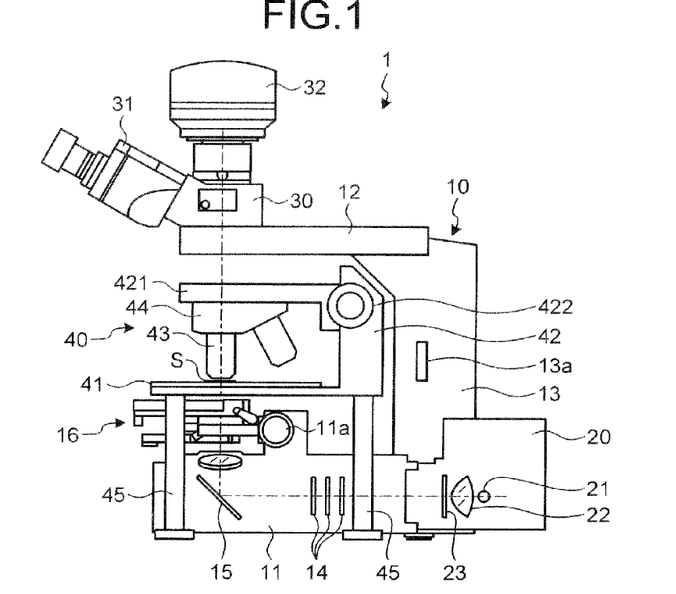
FIG. 1 is a schematic diagram illustrating a configuration of a microscope system according to a first embodiment of the present invention.
Figure 2:
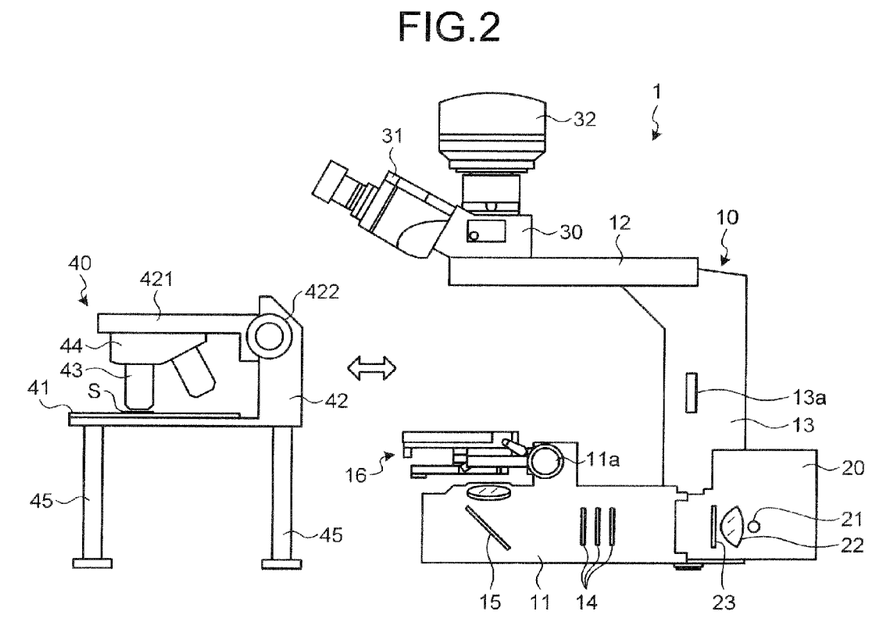
FIG. 2 is a schematic diagram illustrating a configuration of a microscope system according to the first embodiment of the present invention.

First, a microscope system 1 according to a first embodiment will be described in detail with reference to the accompanying drawings. FIGS. 1 and 2 are schematic diagrams illustrating a configuration of the microscope system 1 according to the first embodiment. In the first embodiment, a transmissive type upright microscope will be described as an example.

The microscope system 1 includes a microscope body part 10 having substantially a C shape in a side view, a lamp house 20 (light source unit) attached to the microscope body part 10 and ejecting illumination light for transmitting a specimen S, an adapter 30 attached to the microscope body part 10 and guiding light (observation light) transmitting the specimen S to a lens barrel 31 or a camera 32, and a focusing unit 40 holding the specimen S and focusing the microscope.

The microscope body part 10 includes a base portion 11 forming a foundation, an arm portion 12 extending substantially parallel to a bottom surface of the base portion 11, and a frame portion 13 connecting the ends of the base portion 11 and the arm portion 12.

The base portion 11 is connected with the lamp house 20 and ejects the illumination light from the lamp house 20 to the specimen S. The base portion 11 includes a filter insertion/removal mechanism holding a plurality of filters 14 for adjusting a color tone or brightness of the light source to be inserted/removed, and an illumination optical system configured by a mirror 15 reflecting illumination light to the specimen S. Further, the base portion 11 supports a condenser unit 16 having a condenser that condenses the illumination light from the lamp house 20 to the specimen S.

The arm portion 12 has an observation optical system provided on an optical axis of an objective lens 43 therein. Further, the adapter 30 connected to the arm portion 12 switches a light path to the lens barrel 31 or the camera 32 with respect to the observation light acquired from the observation optical system or branches the observation light to both sides at a ratio of 50:50. In addition, an eyepiece for observing a specimen image of the specimen S with naked eyes is attached to the lens barrel 31.

The frame portion 13 extends vertically from a plate surface of the base portion 11. Further, the frame portion 13 has a power supply substrate 13a that supplies power to the microscope system 1.

The lamp house 20 includes a light source 21, a collector lens 22 collecting light radiated from the light source 21, and a heat ray absorbing filter 23 absorbing a heat ray (infrared ray).

The focusing unit 40 includes a stage 41 for placing the specimen S, a focusing holder 42 having substantially a C shape, which holds the stage 41 on an inner bottom, an objective lens 43 attached to a surface opposite to a holding surface of the stage 41 of the focusing holder 42 through a revolver 44, and four supporting members 45 provided to protrude from a lower surface of the holding surface of the stage 41 of the focusing holder 42.

Herein, assuming a specimen placement surface on which the specimen S is placed is an XY plane, a stage movement mechanism that independently moves the stage 41 in each of an X direction and a Y direction is preferably provided in the stage 41.

The focusing holder 42 includes an elevation unit 421 that holds the objective lens 43 and is movable in a direction perpendicular to the specimen placement surface of the stage 41, and an input unit 422 to input a movement amount of the elevation unit 421. The objective lens 43 is movable vertically on its own optical axis by the elevation unit 421.

The input unit 422 as, for example, a dial connected with a power transmission mechanism implemented by a rack-and-pinion inputs a rotational amount of the dial (pinion) as a movement amount of the objective lens 43 through the power transmission mechanism. In this case, the rack is connected with the elevation unit 421 or provided in the elevation unit 421.

As for the objective lens 43, for example, objective lenses (hereinafter, referred to as a 'low-magnification objective lens') having comparatively low magnifications of 1×, 2×, and 4× and objective lenses (hereinafter, referred to as a 'high-magnification objective lens') of 10×, 20×, and 40× which are high magnifications with respect to the magnifications of the low-magnification objective lenses are mounted on the revolver 44 at least one by one. The magnifications of the low-magnification objective lens and the high-magnification objective lens are examples and the magnification of the high-magnification objective lens needs to be higher than that of the low-magnification objective lens.

The revolver 44 is provided slidably or rotatably with respect to the focusing holder 42 and places the objective lens 43 above the specimen S. The revolver 44 is configured by using an electric revolver, and the like. The revolver 44 holds a plurality of objective lenses 43 having different magnifications (observation magnifications) by a mounter, and alternatively switches the objective lens 43 that is inserted onto the light path of the observation light and used for observation of the specimen S.

Further, the condenser unit 16 is provided in the base portion 11 and has the same configuration as the input unit 422, and the numerical aperture is adjusted by an input unit 11a connected to the power transmission mechanism.

By the aforementioned configuration, the illumination light ejected from the lamp house 20 transmits the specimen S and the transmitted light from the specimen S is transferred to the lens barrel 31 and/or the camera 32 through the objective lens 43 and the observation optical system to observe an observation image of the specimen S.

Herein, the microscope body part 10 and the focusing unit 40 are attachable to and detachable from each other, as illustrated in FIGS. 1 and 2. Further, as illustrated in FIG. 1, while the focusing unit 40 is inserted into the microscope body part 10, and in a state where an optical axis of the illumination light ejected from the lamp house 20 and reflected by the mirror 15 coincides with the optical axis of the objective lens 43, the microscope body part 10 and the focusing unit 40 are arranged not to contact each other.

That is, in a state where the focusing unit 40 is inserted into the microscope body part 10 and the optical axis of the illumination light ejected from the lamp house 20 and reflected by the mirror 15 coincides with the optical axis of the objective lens 43, the lamp house 20 of the microscope body part 10, and the focusing unit 40 do not contact each other, and thus heat generated from the light source 21 of the lamp house 20 is not directly transferred to the stage 41 and the objective lens 43. Accordingly, a focusing position between the stage 41 and the objective lens 43 by heat transfer from the light source 21 can be prevented from being changed.

According to the first embodiment described above, in a state where the optical axis of the illumination light ejected from the lamp house 20 and reflected by the mirror 15 coincides with the optical axis of the objective lens 43, the light source 21, and the stage 41 and the objective lens 43 do not contact each other, such that the heat generated from the light source 21 of the lamp house 20 is not directly transferred to the stage 41 and the objective lens 43, and thus thermal deformation in the stage 41 and the objective lens 43 such as stretching by heat is suppressed to prevent the focusing position from being changed by the heat transfer from the light source.

Further, in the first embodiment, since the stage 41 and the objective lens 43, and the filter 14, the condenser unit 16, the adapter 30, and the like of the microscope body part 10 are separated bodies (do not contact each other), even when vibration occurs by insertion/removal of the filter 14, switching of the condenser unit 16, switching of a light path of the adapter 30, or the like, the vibration is not transferred to the stage 41 and the objective lens 43, and thus the specimen S can be observed by suppressing the influence of the vibration.

Figure 3:
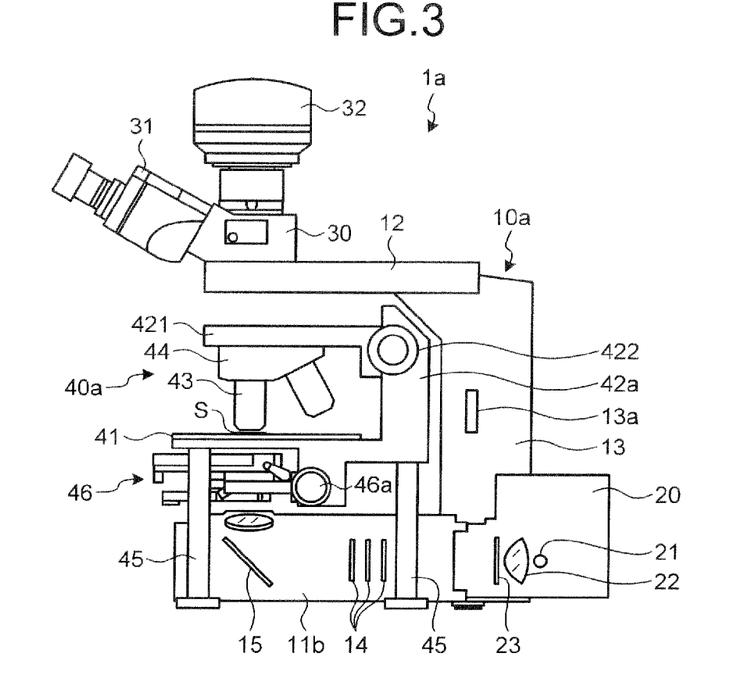
FIG. 3 is a schematic diagram illustrating a configuration of a microscope system according to Modified Example 1-1 of the first embodiment of the present invention.

FIG. 3 is a schematic diagram illustrating a configuration of a microscope system 1a according to Modified Example 1-1 of the first embodiment. In contrast to the focusing unit 40 illustrated in FIGS. 1 and 2, like a focusing unit 40a according to Modified Example 1-1 illustrated in FIG. 3, a focusing holder 42a may hold a condenser unit 46 corresponding to the condenser unit 16. Further, a microscope body part 10a is connected with the lamp house 20, and accordingly, heat transfer from the light source 21 through a base portion 11b may be suppressed even with respect to the condenser unit 46. In addition, the numerical aperture of the condenser unit 46 is adjusted by an input unit 46a having the same configuration as the input unit 11a.

Figure 4:
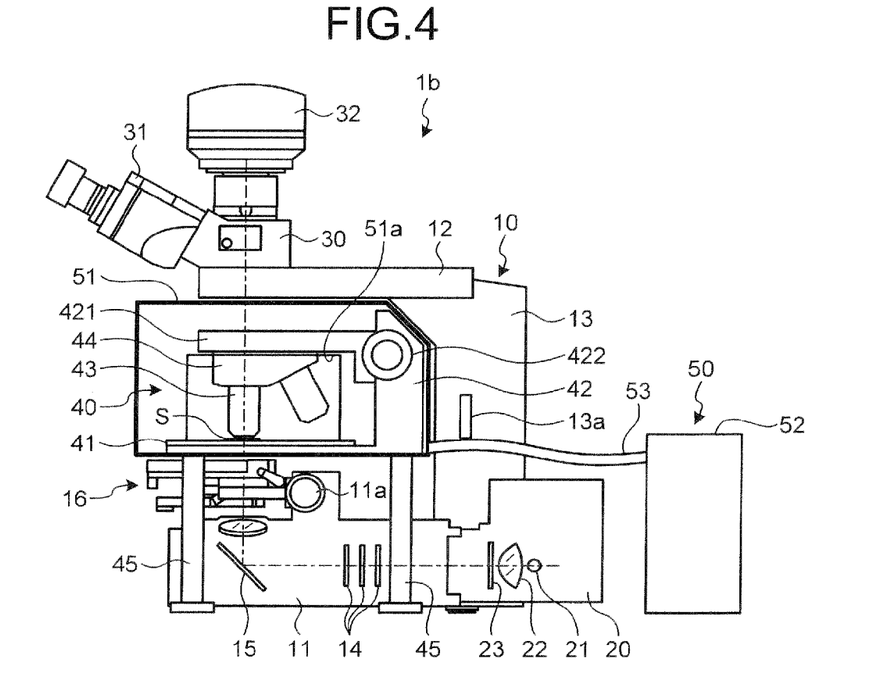
FIG. 4 is a schematic diagram illustrating a configuration of a microscope system according to Modified Example 1-2 of the first embodiment of the present invention.

FIG. 4 is a schematic diagram illustrating a configuration of a microscope system 1b according to Modified Example 1-2 of the first embodiment. The microscope system 1b according to Modified Example 1-2 illustrated in FIG. 4 includes a thermal insulation unit 50 that at least has the stage 41 (specimen S), a thermal insulation box 51 covering the objective lens 43, a temperature adjusting unit 52 adjusting the temperature in the thermal insulation box 51, and a pipe 53 connecting the thermal insulation box 51 and the temperature adjusting unit 52, and transporting gas at the adjusted temperature, in addition to the configuration of the microscope system 1 illustrated in FIGS. 1 and 2.

The thermal insulation box 51 has an opening/closing door 51a opened/closed at the time of replacing the specimen S on the stage 41. In addition, an insertion hole (not illustrated) for inserting the supporting member 45, and the like is provided in the thermal insulation box 51 in addition to the opening/closing door 51a, and the diameter of the insertion hole is equal to the diameter of the supporting member 45 and the gas at the adjusted temperature does not to leak from the hole. Moreover, the through-hole for inserting the illumination light and the observation light transmitting the specimen S may be formed by plugging a through hole provided according to the diameter of light flux with glass, and the like.

In this case, the thermal insulation box 51 is installed not to contact the microscope body part 10. As a result, the heat from the light source 21 is not transferred even to the thermal insulation box 51, and thus the temperature can be stably adjusted without the influence by the heat from the light source 21.

Figure 5:
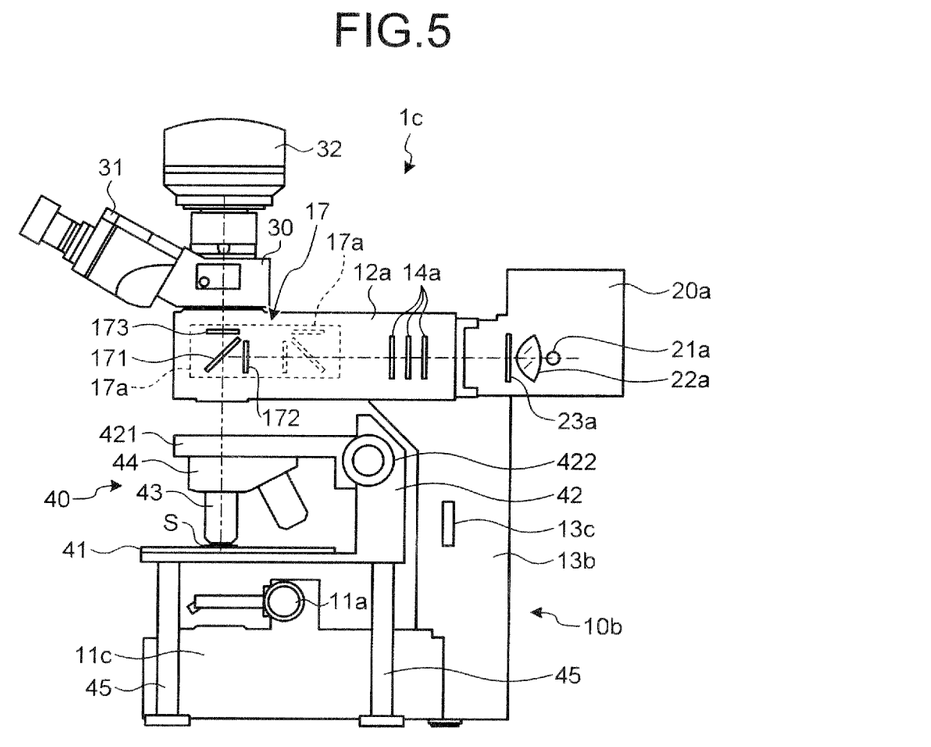
FIG. 5 is a schematic diagram illustrating a configuration of a microscope system according to Modified Example 1-3 of the first embodiment of the present invention.

FIG. 5 is a schematic diagram illustrating a configuration of a microscope system 1c according to Modified Example 1-3 of the first embodiment. Although the microscope system 1 illustrated in FIGS. 1 and 2 described above has been a transmissive type upright microscope, the microscope system 1 may be an incident upright microscope, like the microscope system 1c according to Modified Example 1-3 illustrated in FIG. 5.

The microscope system 1c includes a microscope body part 10b having substantially a C shape, a lamp house 20a attached to the microscope body part 10b and ejecting the illumination light for illuminating the specimen S, an adapter 30 attached to the microscope body part 10b and guiding the light (observation light) transmitting the specimen S to the lens barrel 31 or the camera 32, and the focusing unit 40 holding the specimen S and focusing the microscope. The lamp house 20a includes a light source 21a, a collector lens 22a collecting the light radiated from the light source 21a, and a heat ray absorbing filter 23a absorbing a heat ray (infrared ray), like the aforementioned lamp house 20.

The microscope body part 10b includes a base portion 11c forming a foundation, which has substantially a plate shape, an arm portion 12a extending substantially parallel to a bottom surface of the base portion 11c and connected with each of the lamp house 20a and the adapter 30, and a frame portion 13b connecting the ends of the base portion 11c and the arm portion 12a. The frame portion 13b has a power supply substrate 13c that supplies power to the microscope system 1c.

The arm portion 12a ejects the illumination light from the lamp house 20a to the specimen S. The arm portion 12a allows incident illumination light ejected from the lamp house 20a to pass through a plurality of filters 14a holding a filter for adjusting a color tone or brightness of the light source and reflects the illumination light toward the specimen S by a cube unit 17. Further, the optical axis of the illumination light ejected from the lamp house 20a (reflected by the cube unit 17) coincides with the optical axis of the objective lens 43. The cube unit 17 includes a plurality of cubes 17a and selectively places each cube 17a on an optical path according to a speculum method.

The cube 17a includes a dichroic mirror 171 reflecting the light having a predetermined wavelength and transmitting light having the predetermined wavelength in light emitted by the specimen S, an excitation filter 172 extracting light corresponding to the excitation wavelength reflected by the dichroic mirror 171 from emission light ejected from the lamp house 20a, and an absorption filter 173 extracting light having a desired wavelength from the light emitted by the specimen S. Herein, the dichroic mirror 171 of each of the plurality of cubes 17a reflects the light having the wavelength corresponding to each predetermined excitation wavelength and transmits the light having the predetermined wavelength generated from the specimen S.

The illumination light from the lamp house 20a is switched (reflected) to the specimen S or the light (observation light) from the specimen S is switched (transmitted) to the adapter 30 by the cube 17a to switch the optical path.

Second Embodiment

Figure 6:
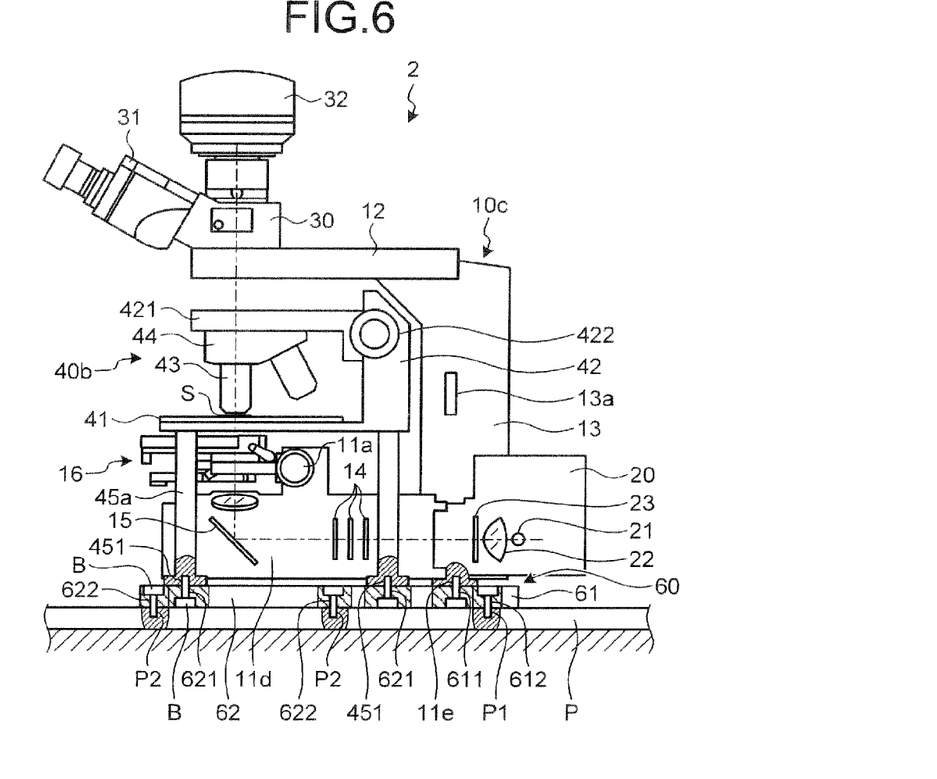
FIG. 6 is a partial cross-sectional view illustrating a configuration of a microscope system according to a second embodiment of the present invention.

FIG. 6 is a partial cross-sectional view illustrating a configuration of a microscope system 2 according to a second embodiment. The same reference numerals refer to the same components as those described in FIG. 1, and the like. The microscope system 2 includes a microscope body part 10c having substantially a C shape, the lamp house 20 attached to the microscope body part 10c and ejecting the illumination light for transmitting the specimen S, an adapter 30 attached to the microscope body part 10c and guiding the light (observation light) transmitting the specimen S to the lens barrel 31 or the camera 32, and a focusing unit 40b holding the specimen S and focusing the microscope. Further, in the second embodiment, the microscope body part 10c and the focusing unit 40b are fixed onto a positioning member 60 (see FIG. 7).

The microscope body part 10c includes a base portion 11d forming a foundation, which has substantially a plate shape, the arm portion 12 extending substantially parallel to a bottom surface of the base portion 11d, and a frame portion 13 connecting the ends of the base portion 11d and the arm portion 12.

The base portion 11d is connected with the lamp house 20 and ejects the illumination light from the lamp house 20 to the specimen S. Further, the base portion 11d includes a filter insertion/removal mechanism constituted by the plurality of filters 14, the illumination optical system configured by the mirror 15, and the condenser unit 16. In addition, a bolt hole 11e (insertion hole) into which a bolt B (pin) is inserted is formed at the base portion 11d.

The focusing unit 40b includes the stage 41, the focusing holder 42, the objective lens 43, and the four supporting members 45a provided to protrude from a lower surface of a stage holding surface of the focusing holder 42 as described above. Further, a bolt hole 451 (insertion hole) into which the bolt B is inserted is formed at each supporting member 45a.

Figure 7:
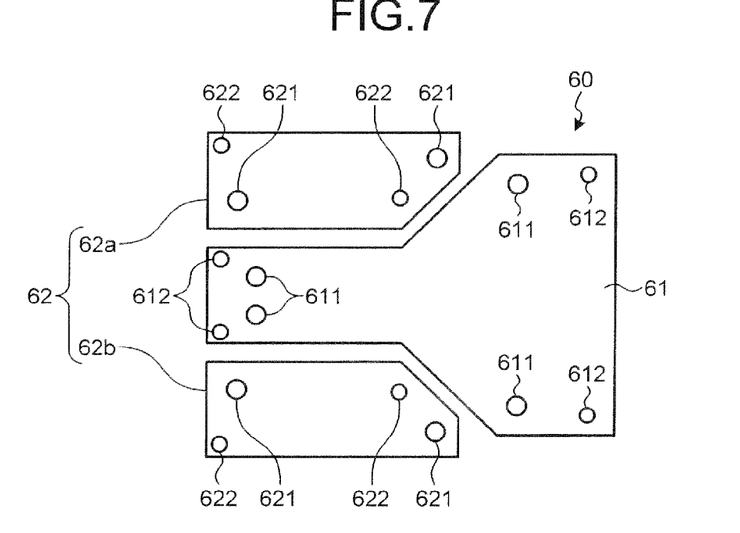
FIG. 7 is a schematic diagram illustrating a configuration of a principal part of the microscope system according to the second embodiment of the present invention.

FIG. 7 is a schematic diagram illustrating a configuration of the positioning member 60 of the microscope system 2. The positioning member 60 includes a microscope body fixing unit 61 fixed onto a placement surface P such as a vibration-free stand, and the like, on which the microscope system 2 is placed, and connected with the base portion 11d to fix the microscope body part 10c, and a focusing unit fixing unit 62 connected with the supporting member 45a to fix the focusing unit 40b. The positioning member 60 is preferably made of a thermal insulating material (a material having low thermal conductivity).

A bolt hole 611 (through hole) provided in a place corresponding to the bolt hole 11e and a bolt hole 612 provided at a place corresponding to a bolt hole P1 formed on the placement surface P are formed in the microscope body fixing unit 61.

The focusing unit fixing unit 62 includes a first focusing unit fixing unit 62a and a second focusing unit fixing unit 62b, and the first focusing unit fixing unit 62a and the second focusing unit fixing unit 62b are placed on sides of the microscope body fixing unit 61, respectively. A bolt hole 621 (through hole) provided at a place corresponding to the bolt hole 451 and a bolt hole 622 provided at a place corresponding to a bolt hole P2 formed on the placement surface P are formed in the first focusing unit fixing unit 62a and the second focusing unit fixing unit 62b, respectively.

In the microscope body part 10c, the bolt hole 11e and the bolt hole 611 provided in the microscope body fixing unit 61 are fixed through the bolt B. In the focusing unit 40b, the bolt hole 451 and the bolt hole 621 provided in the focusing unit fixing unit 62 are fixed through the bolt B.

Further, the microscope body fixing unit 61 and the focusing unit fixing unit 62 are positioned each other with the bolt holes P1 and P2 provided on the placement surface P, and the bolt holes 612 and 622 respectively being fixed through the bolt B. A relative position between the microscope body part 10c and the focusing unit 40b is determined by the positioning.

According to the second embodiment described above, in a state where the optical axis of the illumination light ejected from the lamp house 20 and reflected by the mirror 15 coincides with the optical axis of the objective lens 43, the light source 21, and the stage 41 and the objective lens 43 do not contact each other, and thus the heat generated from the light source 21 of the lamp house 20 can be suppressed from being transferred to the stage 41 and the objective lens 43 and a focusing position can be prevented from being changed by the heat transfer from the light source.

Further, in the second embodiment, since the relative position between the microscope body part 10c and the focusing unit 40b is determined and fixed by the positioning member 60, the optical axes of the illumination light ejected from the lamp house 20 and reflected by the mirror 15, and the observation light from the specimen S, and the optical axis of the objective lens 43 can reliably coincide with each other.

In the second embodiment described above, the microscope body part 10c and the focusing unit 40b are fixed and positioned by screw-joining the bolt to the bolt hole, but the pin may be inserted into the through hole, and may be inserted into insertion holes provided in the microscope body part 10c and the focusing unit 40b, respectively.

Figure 8:
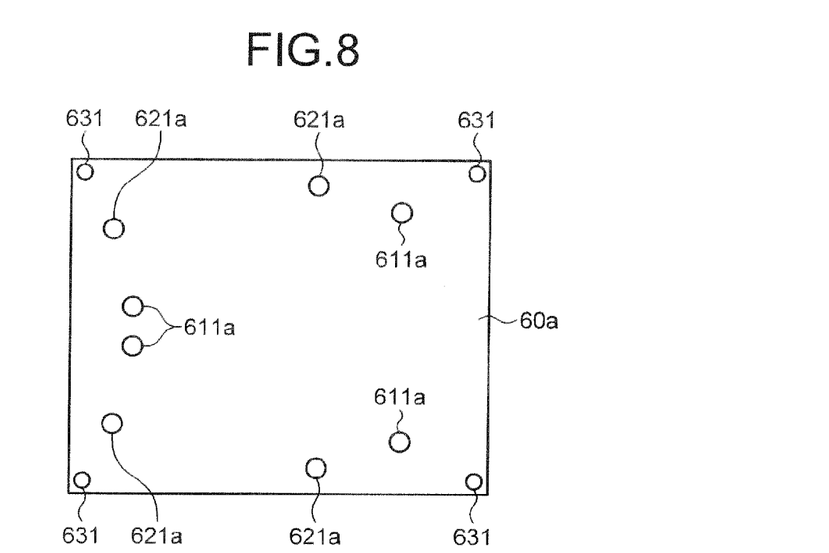
FIG. 8 is a schematic diagram illustrating a configuration of a principal part of a microscope system according to Modified Example 2-1 of the second embodiment of the present invention.

FIG. 8 is a schematic diagram illustrating a configuration of a positioning member 60a according to Modified Example 2-1 of the second embodiment. Like Modified Example 2-1 illustrated in FIG. 8, the microscope body fixing unit 61 and the focusing unit fixing unit 62 may be integrated with respect to the positioning member 60 illustrated in FIG. 7.

The positioning member 60a has substantially the plate shape and has bolt holes 611a and 621a formed to correspond to the bolt holes 611 and 621 as described above, and a bolt hole 631 inserted by the bolt B to be connected to the placement surface P. Further, the bolt holes 611a and 621a correspond to the placements of the bolt holes 611 and 621 of the microscope body fixing unit 61 and the focusing unit fixing unit 62 when the optical axis of the illumination light ejected from the lamp house 20 and reflected by the mirror 15 coincides with the optical axis of the objective lens 43 of the focusing unit 40b. The positioning member 60a is preferably formed of the thermal insulating material (the material having low thermal conductivity).

Third Embodiment

Figure 9:
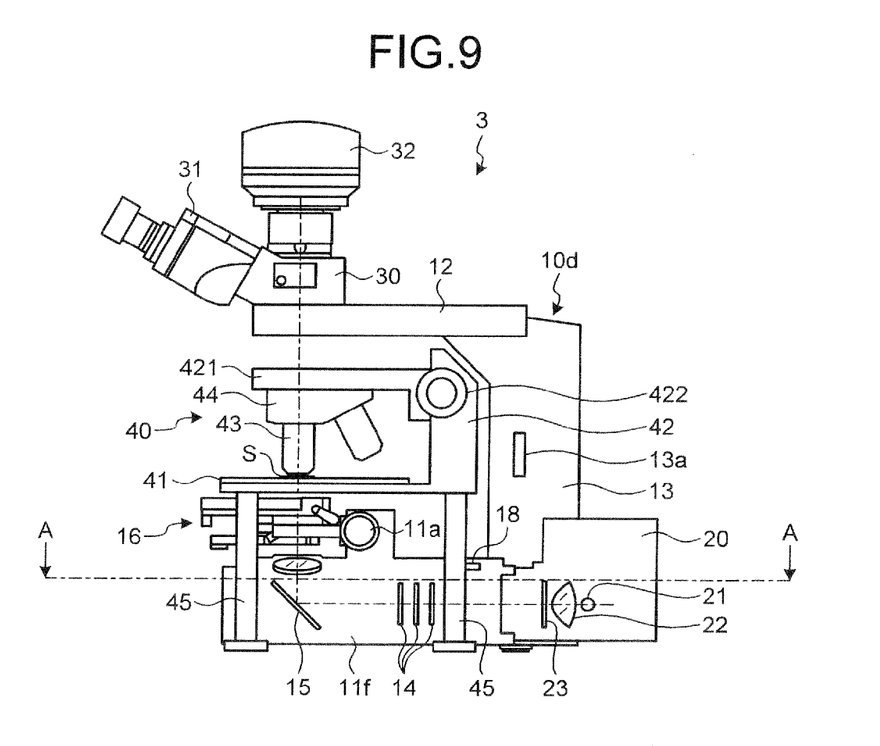
FIG. 9 is a schematic diagram illustrating a configuration of a microscope system according to a third embodiment of the present invention.

FIG. 9 is a schematic diagram illustrating a configuration of a microscope system 3 according to a third embodiment. Further, the same reference numerals refer to the same components as those described in FIG. 1, and the like. The microscope system 3 includes a microscope body part 10d having substantially a C shape, a lamp house 20 attached to the microscope body part 10d and ejecting the illumination light for transmitting the specimen S, an adapter 30 attached to the microscope body part 10d and guiding the light (observation light) transmitting the specimen S to the lens barrel 31 or the camera 32, and a focusing unit 40 holding the specimen S and focusing the microscope.

The microscope body part 10d includes a base portion 11f forming a foundation, which has substantially a plate shape, the arm portion 12 extending substantially parallel to a bottom surface of the base portion 11f, and a frame portion 13 connecting the ends of the base portion 11f and the arm portion 12.

The base portion 11f is connected with the lamp house 20 and ejects the illumination light from the lamp house 20 to the specimen S. Further, the base portion 11f includes the filter insertion/removal mechanism constituted by the plurality of filters 14, the illumination optical system configured by the mirror 15 and the condenser unit 16, and substantially bar-shaped studs 18 (positioning member) that protrudes from respective side surfaces of the base portion 11f.

Figure 10:
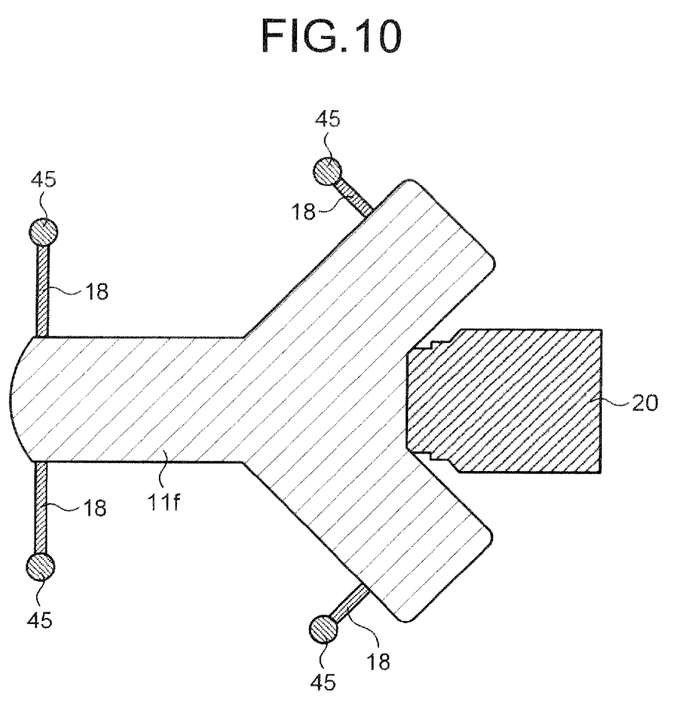
FIG. 10 is a cross-sectional view illustrating a cross section taken along line A-A of FIG. 9.
Figure 11:
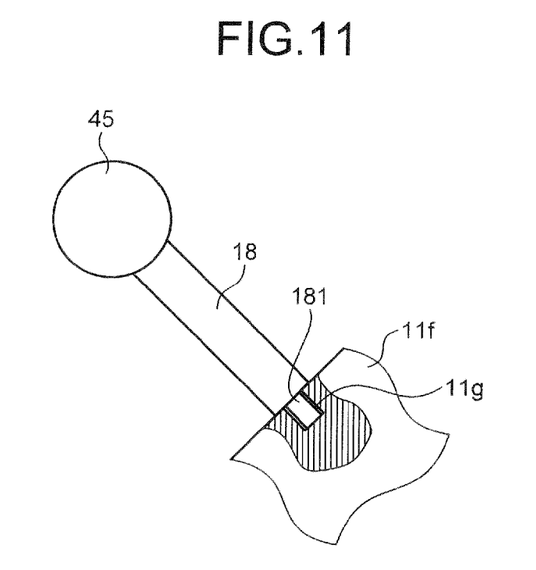
FIG. 11 is a partial cross-sectional view illustrating a configuration of a principal part of the microscope system according to the third embodiment of the present invention.

FIG. 10 is a cross-sectional view illustrating a cross section taken along line A-A of FIG. 9. FIG. 11 is a partial cross-sectional view illustrating a configuration of the stud 18 of the microscope system 3. As illustrated in FIG. 10, each stud 18 protrudes from the side surface of the base portion 11f to contact at a predetermined position where the supporting member 45 is placed. Further, as illustrated in FIG. 11, each stud 18 has a protruded end 181 protruding in a direction in which the stud 18 extends from one end and is fixed with the protruded end 181 engaging with a guide hole 11g formed in the base portion 11f. The stud 18 is preferably made of the thermal insulating material (the material having low thermal conductivity).

A relative position between the microscope body part 10d and the focusing unit 40 is determined with the four studs 18 contacting each other at the predetermined positions of the supporting member 45. As a result, it is possible to position the microscope body part 10d and the focusing unit 40. In this case, a contact area between the microscope body part 10d and the focusing unit 40 is smaller than a contact area between the light source, and the stage and the objective lens in the microscope in the related art.

According to the third embodiment described above, in a state where the optical axis of the illumination light ejected from the lamp house 20 and reflected by the mirror 15 coincides with the optical axis of the objective lens 43, the contact area between the microscope body part 10d and the focusing unit 40 is set to be small, and thus the heat generated from the light source 21 of the lamp house 20 can be suppressed from being transferred to the stage 41 and the objective lens 43 and the focusing position can be prevented from being changed by the heat transfer from the light source.

Further, in the third embodiment, since the relative position between the microscope body part 10d and the focusing unit 40 is determined by the stud 18 of the base portion 11f, the optical axes of the illumination light ejected from the lamp house 20 and the observation light from the specimen S, and the optical axis of the objective lens 43 can reliably coincide with each other. In addition, positioning of the microscope body part 10d and the focusing unit 40 can be simply performed and the microscope body part 10d and the focusing unit 40 are easily attached/detached, as compared with the second embodiment described above. Even in this configuration, the light source 21, and the stage 41 and the objective lens 43 do not contact each other.

An installation position of the stud 18 may be provided at another place of the base portion 11f and provided in the frame portion 13 as long as the relative position between the microscope body part 10d and the focusing unit 40 can be determined.

Figure 12:
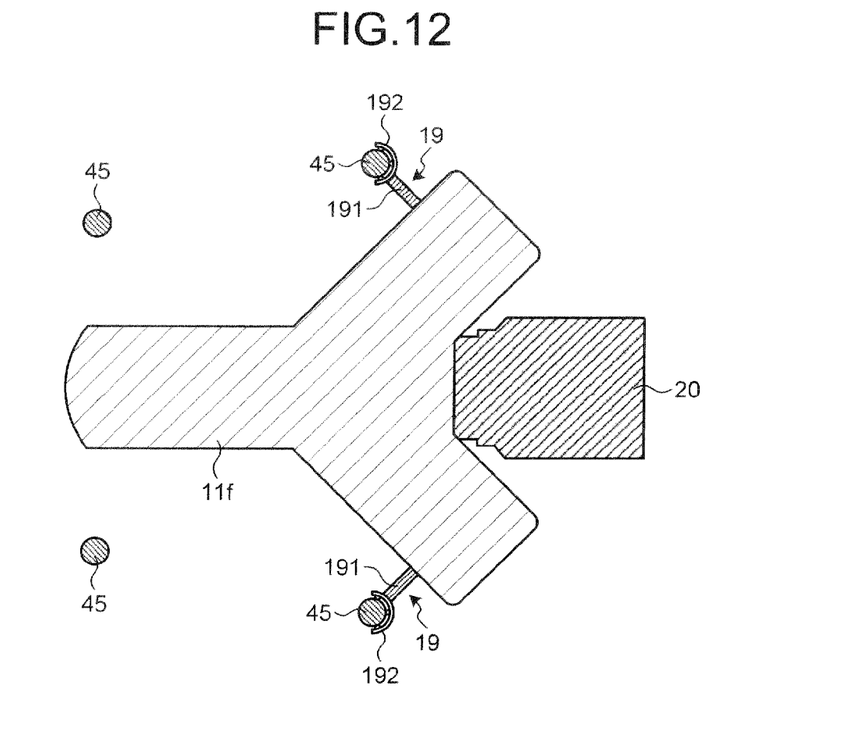
FIG. 12 is a cross-sectional view illustrating a configuration of a microscope system according to Modified Example 3-1 of the third embodiment of the present invention.
Figure 13:
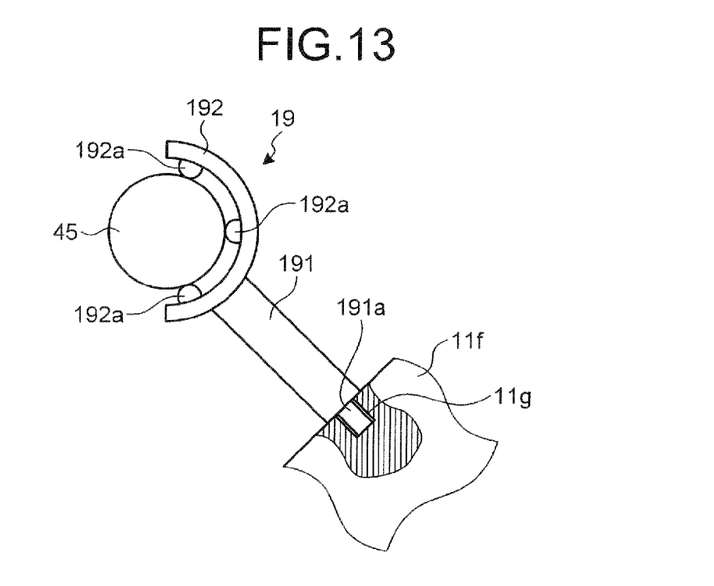
FIG. 13 is a partial cross-sectional view illustrating a configuration of a principal part of the microscope system according to Modified Example 3-1 of the third embodiment of the present invention.

FIG. 12 is a cross-sectional view corresponding to the cross section take along line A-A of FIG. 9 and illustrating a configuration of a stud 19 according to Modified Example 3-1 of the third embodiment. FIG. 13 is a partial cross-sectional view illustrating the configuration of the stud 19 according to Modified Example 3-1 of the third embodiment. As illustrated in FIG. 12, two studs 19 (positioning members) include a bar-shaped protruded portion 191 that protrudes from the side of the base portion 11f and a contact portion 192 provided at the end of a side different from a connection side of the protruded portion 191 with the base portion 11f and contacting the supporting member 45. Further, as illustrated in FIG. 13, the protruded portion 191 has a protruded end 191a protruding in a direction in which the stud 19 extends from the end of a side different from a connection side with the contact portion 192 and is fixed with the protruded end 191a engaging with the guide hole 11g formed at the base portion 11f. Incidentally, the contact portion 192 is slidable on an outer peripheral surface with respect to the protruded portion 191.

The contact portion 192 has an arc shape corresponding to an outer peripheral shape of the supporting member 45 and includes a plurality of convex portions 192a protruding from an inner side having the arc shape to have a convex shape. The convex portion 192a determines the position of the base portion 11f (microscope body part) with respect to the supporting member 45 (focusing unit 40) by contacting the side of each supporting member 45.

Figure 14:
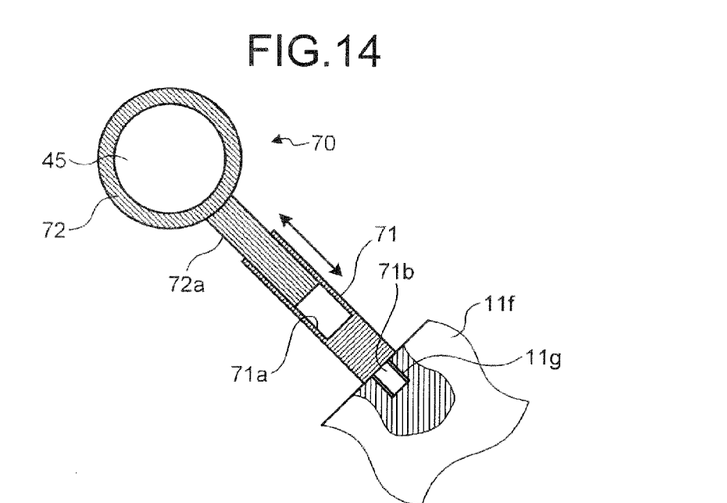
FIG. 14 is a partial cross-sectional view illustrating a configuration of a principal part of a microscope system according to Modified Example 3-2 of the third embodiment of the present invention.

FIG. 14 is a partial cross-sectional view illustrating a configuration of a stud 70 according to Modified Example 3-2 of the third embodiment. As illustrated in FIG. 14, the stud 70 includes a bar-shaped protruded portion 71 protruding from the side of the base portion 11f and a cover 72 connected to the end of a side different from the connection side of the protruded portion 71 with the base portion 11f and covering a part of the side of the supporting member 45. Further, the protruded portion 71 includes a hollow portion 71a forming a hollow inner space, a protruded end 71b protruding in a direction in which the protruded portion 71 extends from the end of a side different from a connection side with the cover 72, and is fixed with the protruded end 71b being screw-joined with the guide hole 11g formed at the base portion 11f.

The cover 72 has substantially an annular shape to cover the outer periphery of the supporting member 45 and includes an engagement member 72a protruding from an outer peripheral side to engage with the hollow portion 71a. The engagement member 72a is inserted and engages into an inner space of the hollow portion 71a of the protruded portion 71. Accordingly, the protruded portion 71 and the cover 72 are connected with each other, and the protruded end 71b is screw-joined with the guide hole 11g to advance and retreat with respect to the inside by rotating the protruded portion 71, and as a result, the relative position between the supporting member 45 and the base portion 11f is adjusted by extending a distance between the supporting member 45 and the base portion 11f, thereby determining the position of the base portion 11f (microscope body part) with respect to the supporting member 45 (focusing unit 40). Further, the cover 72 is slidable on an outer peripheral surface of the supporting member 45. In addition, the stud 70 may be separated from the microscope body part after determining the relative position between the microscope body part and the focusing unit.

Fourth Embodiment

Figure 15:
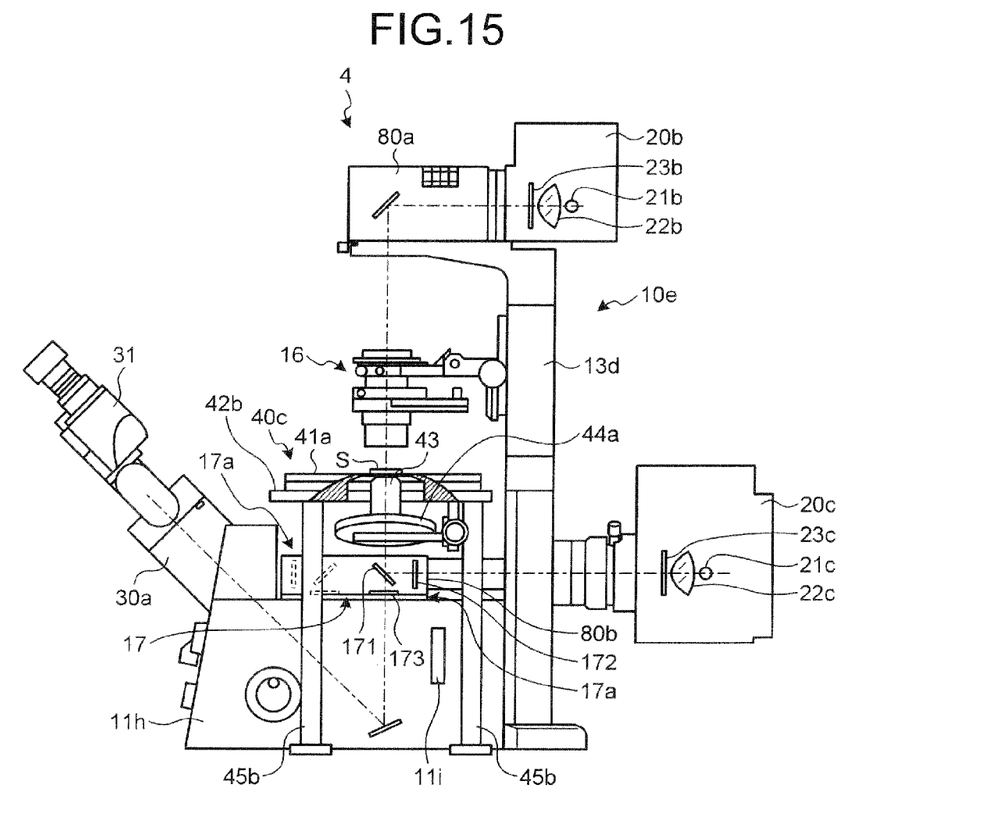
FIG. 15 is a schematic diagram illustrating a configuration of a principal part of a microscope system according to a fourth embodiment of the present invention.

FIG. 15 is a schematic diagram illustrating a configuration of a microscope system 4 according to a fourth embodiment. Further, the same reference numerals refer to the same components as those described in FIG. 1, and the like. The microscope systems illustrated in FIGS. 1 to 14 which are described above use the upright microscopes. Alternatively, inverted microscopes may be used. The microscope system 4 which uses an inverted microscope includes a microscope body part 10e having substantially a C shape, a transmitted-light illumination lamp house 20b attached to the microscope body part 10e and ejecting the illumination light for transmitting the specimen S, an incident-light illumination lamp house 20c ejecting the illumination light which is incident in the specimen S, an adapter 30a attached to the microscope body part 10e and guiding the light (observation light) transmitting the specimen S to the lens barrel 31, and a focusing unit 40c holding the specimen S and focusing the microscope.

The microscope body part 10e includes a base portion 11h forming a foundation, which has substantially a plate shape, an arm portion 80a extending substantially parallel to a bottom surface of the base portion 11h, and a frame portion 13d supporting the condenser unit 16 and connecting the ends of the base portion 11h and the arm portion 80a.

The base portion 11h includes a power supply substrate 11i supplying power to the microscope system 4 and an illumination and imaging unit 80b ejecting the illumination light from the incident-light illumination lamp house 20c to the specimen S. Further, the base portion 11h supports the adapter 30a, and supports the incident-light illumination lamp house 20c through the illumination and imaging unit 80b.

The arm portion 80a is connected with the transmitted-light illumination lamp house 20b and ejects the illumination light from the transmitted-light illumination lamp house 20b to the specimen S.

The illumination and imaging unit 80b has the cube unit 17. The illumination light from the incident-light illumination lamp house 20c is switched (reflected) to the specimen S or the light (observation light) from the specimen S is switched (transmitted) to the adapter 30a side, by each cube 17a of the cube unit 17, thereby switching the light path.

The transmitted-light illumination lamp house 20b includes a light source 21b, a collector lens 22b collecting light ejected from the light source 21b, and a heat ray absorbing filter 23b absorbing a heat ray (infrared ray).

The incident-light illumination lamp house 20c includes a light source 21c, a collector lens 22c collecting light ejected from the light source 21c, and a heat ray absorbing filter 23c absorbing a heat ray (infrared ray).

The focusing unit 40c includes a stage 41a placing the specimen S, a focusing holder 42b holding the stage 41a, which has substantially a plate shape, an objective lens 43 attached to a lower surface of a holding surface of the stage 41a of the focusing holder 42b through a revolver 44a, and four supporting members 45b provided to protrude from the lower surface of the holding surface of the stage of the focusing holder 42b.

Herein, when the focusing unit 40c is installed in the microscope body part 10e, an optical axis of the transmitting illumination light ejected by the arm portion 80a, the optical axis of the condenser unit 16, the optical axis of the objective lens 43, and an optical axis of the incident illumination light ejected by the illumination and imaging unit 80*b* coincide with a linear axis. That is, the optical axes coincide with one axis.

According to the fourth embodiment described above, in a state where the optical axis of the illumination light and the optical axis of the objective lens 43 coincide with each other, the light sources 21*b* and 21*c* do not contact the stage 41*a* and the objective lens 43, and thus heat generated from the light source of each lamp house is not directly transferred to the stage 41*a* and the objective lens 43 and the focusing position can be prevented from being changed by the heat transfer from the light source.

Figure 16:
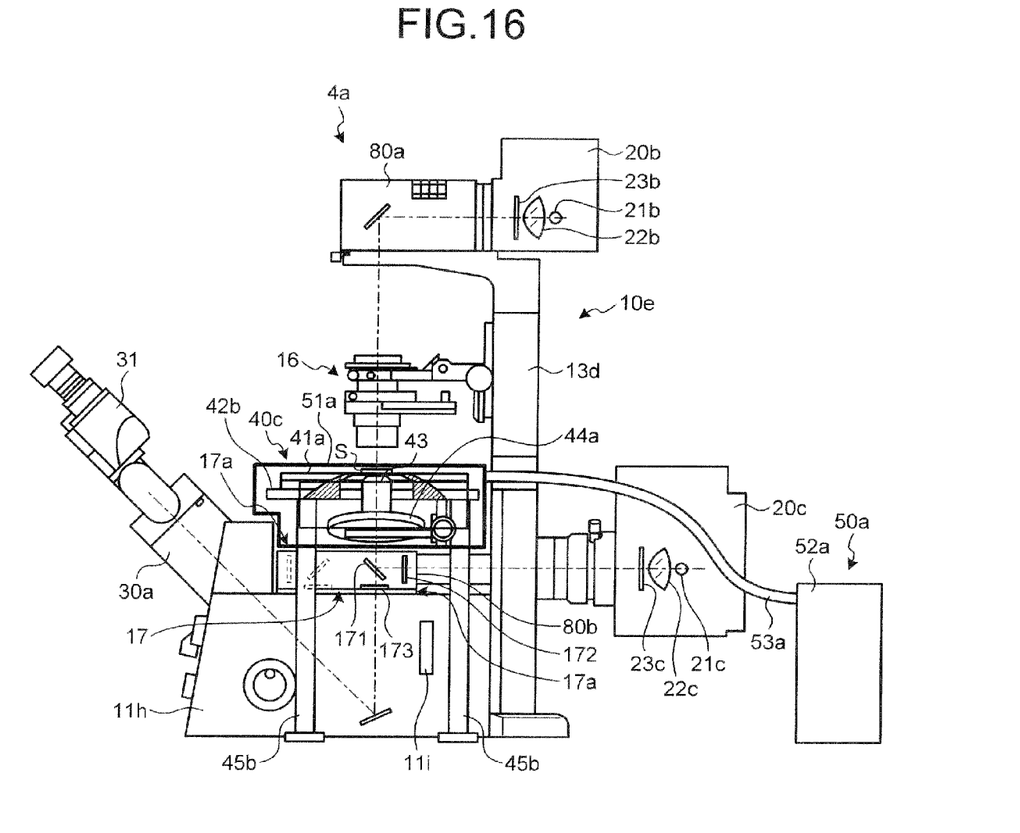
FIG. 16 is a schematic diagram illustrating a configuration of a microscope system according to Modified Example 4-1 of the fourth embodiment of the present invention.

FIG. 16 is a schematic diagram illustrating a configuration of a microscope system 4*a* according to Modified Example 4-1 of the fourth embodiment. The microscope system 4*a* according to Modified Example 4-1 illustrated in FIG. 16 includes a thermal insulation unit 50*a* that at least has the stage 41*a* (specimen S), a thermal insulation box 51*a* covering the objective lens 43, a temperature adjusting unit 52*a* adjusting the temperature in the thermal insulation box 51*a*, and a pipe 53*a* connecting the thermal insulation box 51*a* and the temperature adjusting unit 52*a*, and transporting gas at the adjusted temperature, in addition to the configuration of the microscope system 4 illustrated in FIG. 15. The thermal insulation unit 50*a* has the same configuration and function as the thermal insulation unit 50.

Incidentally, the first to fourth embodiments described above and the modified examples according to the respectively embodiments may be appropriately combined. For example, in the second to fourth embodiments, the configuration in which the focusing unit has the condenser may be applied like Modified Example 1-1 illustrated in FIG. 3.

As set forth above, the microscope system according to the present invention is useful to prevent the focusing position from being changed by the heat transfer from the light source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system, comprising:
a microscope body part including a base portion forming a foundation, an arm portion extending substantially parallel to a bottom surface of the base portion, and a frame portion connecting the ends of the base portion and the arm portion, the microscope body part having substantially a C shape in a side view and holding an illumination optical system ejecting illumination light from a light source to a specimen;
a light source unit connected with the microscope body part and radiating the illumination light to the illumination optical system; and
a focusing unit supporting a stage for placing the specimen and at least holding an objective lens focusing the specimen by collecting observation light from the specimen on the stage,
wherein the microscope body part and the focusing unit do not contact each other in a state where an optical axis of the objective lens coincides with an optical axis of the illumination light.

2. The microscope system according to claim 1, wherein the focusing unit includes a condenser condensing the illumination light.

3. The microscope system according to claim 1, further comprising:
a positioning member positioning the focusing unit and the microscope body part such that the optical axis of the objective lens coincides with the optical axis of the illumination light.

4. The microscope system according to claim 3, wherein the microscope body part and the focusing unit include insertion holes on the bottom thereof, and
the positioning member includes:
a through hole formed in a plate-shaped member and arranged at a position corresponding to the insertion hole; and
a pin inserted into the through hole, and inserted into the focusing unit and the microscope body part to position the focusing unit and the microscope body part.

5. The microscope system according to claim 4, wherein the positioning member includes:
a microscope body fixing unit fixing and positioning the microscope body part; and
a focusing unit fixing unit fixing and positioning the focusing unit.

6. The microscope system according to claim 3, wherein the positioning member protrudes from the microscope body part to contact a predetermined position of the focusing unit.

* * * * *